(12) United States Patent
Ito (10) Patent No.: US 11,799,128 B2
(45) Date of Patent: Oct. 24, 2023

(54) LGPS-BASED SOLID ELECTROLYTE AND PRODUCTION METHOD

(71) Applicant: MITSUBISHI GAS CHEMICAL COMPANY, INC., Tokyo (JP)

(72) Inventor: Tomohiro Ito, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 555 days.

(21) Appl. No.: 16/972,735

(22) PCT Filed: Jun. 4, 2019

(86) PCT No.: PCT/JP2019/022075
§ 371 (c)(1),
(2) Date: Dec. 7, 2020

(87) PCT Pub. No.: WO2019/239949
PCT Pub. Date: Dec. 19, 2019

(65) Prior Publication Data
US 2021/0313618 A1    Oct. 7, 2021

(30) Foreign Application Priority Data
Jun. 13, 2018    (JP) .................. 2018-112866

(51) Int. Cl.
*H01M 10/0562*    (2010.01)
*C01G 19/00*    (2006.01)
*H01M 10/0525*    (2010.01)

(52) U.S. Cl.
CPC ...... *H01M 10/0562* (2013.01); *C01G 19/006* (2013.01); *H01M 10/0525* (2013.01); *C01P 2002/72* (2013.01); *H01M 2300/0068* (2013.01)

(58) Field of Classification Search
CPC ......... H01M 10/0562; H01M 10/0525; H01M 2300/0068; H01M 10/052; C01G 19/006;
(Continued)

(56) References Cited

U.S. PATENT DOCUMENTS

| 2013/0040208 A1 | 2/2013 | Kanno et al. |
| 2015/0017548 A1 | 1/2015 | Kato et al. |
| 2015/0037687 A1 | 2/2015 | Kanno et al. |
| 2015/0333367 A1 | 11/2015 | Kato et al. |
| 2015/0333368 A1 | 11/2015 | Kato et al. |

(Continued)

FOREIGN PATENT DOCUMENTS

| JP | 2013-177288 A | 9/2013 |
| JP | 6044587 B2 | 12/2016 |

(Continued)

OTHER PUBLICATIONS

Office Action issued in the corresponding Indian Patent Application No. 202017044906 dated Aug. 23, 2022, along with English translation thereof.

(Continued)

*Primary Examiner* — Gary D Harris
(74) *Attorney, Agent, or Firm* — GREENBLUM & BERNSTEIN, P.L.C.

(57) ABSTRACT

The present invention is able to provide an LGPS-based solid electrolyte characterized by: satisfying a composition of $Li_uSn_vP_2S_yX_z$ ($6 \leq u \leq 14$, $0.8 \leq v \leq 2.1$, $9 \leq y \leq 16$, $0 < z \leq 1.6$; X represents Cl, Br, or I); and having, in X-ray diffraction (CuKα: λ=1.5405 Å), peaks at least at positions of 2θ=19.80°±0.50°, 20.10°±0.50°, 26.60°±0.50°, and 29.10°±0.50°.

8 Claims, 2 Drawing Sheets

(58) Field of Classification Search
CPC .. C01G 19/00; C01P 2002/72; C01P 2002/74; C01P 2002/84; C04B 2235/3203; C04B 2235/42; C04B 2235/761; C04B 35/547; Y02E 60/10; C01B 17/22; C01B 25/14; H01B 1/06; H01B 1/10
USPC .......................................................... 429/322
See application file for complete search history.

(56) References Cited

U.S. PATENT DOCUMENTS

| | | |
|---|---|---|
| 2016/0149258 A1 | 5/2016 | Kanno et al. |
| 2016/0248119 A1 | 8/2016 | Kato |
| 2018/0205116 A1 | 7/2018 | Kanno et al. |
| 2019/0074541 A1* | 3/2019 | Kanno .............. H01M 10/0562 |

FOREIGN PATENT DOCUMENTS

| | | |
|---|---|---|
| JP | 6044588 B2 | 12/2016 |
| JP | 2017-21965 A | 1/2017 |
| JP | 6222134 B2 | 11/2017 |
| WO | 2011/118801 A1 | 9/2011 |
| WO | 2013/118722 A1 | 8/2013 |
| WO | 2017/155119 A1 | 9/2017 |
| WO | 2018/096957 A1 | 5/2018 |

OTHER PUBLICATIONS

Kato, Yuki et al., "High-power all-solid-state batteries using sulphide superionic conductors", Nature Energy 1, Article No. 16030, 2016.
Basso, Andrea et al., "The Tarnishing of Silver Alloys: Causes And Possibilities", The Santa Fe Symposium, 2010.
International Search Report issued in International Patent Application No. PCT/JP2019/022075, dated Aug. 27, 2019, along with English Translation thereof.
Written Opinion of the International Searching Authority issued in International Patent Application No. PCT/JP2019/022075, dated Aug. 27, 2019, along with English Translation thereof.

* cited by examiner

LGPS-BASED SOLID ELECTROLYTE AND PRODUCTION METHOD

TECHNICAL FIELD

The present invention relates to an LGPS-based solid electrolyte and a method for producing the same. Note that an LGPS-based solid electrolyte refers to a solid electrolyte having a specific crystal structure including Li, P and S, but the present invention is a solid electrolyte including Li, Sn, P, S and halogen.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

Among sulfide solid electrolytes, there is an LGPS-based solid electrolyte having a specific crystal structure (Non-Patent Document 1 and Patent Document 1). Among sulfide solid electrolytes, LGPS has significantly high ion conductivity and can stably act at from a low temperature of −30° C. to a high temperature of 100° C., and therefore practical use thereof is highly expected.

The development of compositions for LGPS-based solid electrolytes not using expensive Ge has been advanced, and among them, compositions including Si and halogen are known to have high ion conductivity (Patent Documents 2-4). However, since $SiS_2$ that is one of raw materials has very high reactivity with water (Non-Patent Document 2), $H_2S$ that is toxic is immediately generated in the atmosphere, and $SiS_2$ is partially changed into $SiO_2$. Further, when an LGPS-based solid electrolyte is produced using $SiS_2$ whose quality is changed as a raw material, there is a problem that ion conductivity is significantly reduced.

PRIOR ART DOCUMENTS

Patent Documents

Patent Document 1: International Publication WO2011/118801 pamphlet
Patent Document 2: Japanese Patent No. 6044587
Patent Document 3: Japanese Patent No. 6044588
Patent Document 4: Japanese Patent No. 6222134

Non-Patent Documents

Non-Patent Document 1: Nature Energy 1, Article number: 16030 (2016)
Non-Patent Document 2: THE SANTAFE SYMPOSIUM, May 2010, "The Tarnishing of Silver Alloys: Causes and Possibilities"

SUMMARY OF THE INVENTION

Problems to be Solved by the Invention

Under the above-described circumstances, it has been desired to provide an LGPS-based solid electrolyte, which is not easily affected by change in quality of raw materials in the production process, and which has high ion conductivity, without use of Ge that is an expensive element.

Means for Solving the Problems

The present inventors diligently made researches in consideration of the above-described problems and found that the present invention described below provides an LGPS-based solid electrolyte having high ion conductivity, wherein $SnS_2$ that is not easily affected by moisture is used as a raw material.

Specifically, the present invention is as described below.

<1> An LGPS-based solid electrolyte, which satisfies a composition of $Li_uSn_vP_2S_yX_z$ ($6 \leq u \leq 14$, $0.8 \leq v \leq 2.1$, $9 \leq y \leq 16$, $0 < z \leq 1.6$; X represents Cl, Br or I), and which has peaks at at least $2\theta = 19.80°\pm 0.50°$, $20.10°\pm 0.50°$, $26.60°\pm 0.50°$ and $29.10°\pm 0.50°$ in X-ray diffraction (CuKα: λ=1.5405 Å).

<2> The LGPS-based solid electrolyte according to item <1>, wherein when the diffraction intensity of the peak at $2\theta = 29.10°\pm 0.50°$ is referred to as $I_A$ and the diffraction intensity of the peak at $2\theta = 27.33°\pm 0.50°$ is referred to as $I_B$, $I_B/I_A$ is less than 0.50.

<3> The LGPS-based solid electrolyte according to item <1> or <2>, which has an octahedron O composed of an Li element and an S element, a tetrahedron $T_1$ composed of at least one element selected from the group consisting of P and Sn and an S element, and a tetrahedron $T_2$ composed of a P element and an S element, and which mainly includes a crystal structure in which the tetrahedron $T_1$ and the octahedron O share an edge and the tetrahedron $T_2$ and the octahedron O share an apex, wherein a part of the S elements in the octahedron O, the tetrahedron $T_1$ and the tetrahedron $T_2$ may be substituted with Cl, Br or I.

<4> An all-solid-state battery obtained by using the LGPS-based solid electrolyte according to any one of items <1> to <3>.

<5> A method for producing the LGPS-based solid electrolyte according to any one of items <1> to <3>, which comprises:
a solution-making step in which a homogeneous solution is prepared by mixing and reacting $Li_2S$ and $P_2S_5$ in an organic solvent, wherein the molar ratio of $Li_2S/P_2S_5$ is 0.75 to 1.85;
a precipitation step in which LiX (X represents Cl, Br or I) is added to and dissolved in the homogeneous solution, followed by adding $SnS_2$ and $Li_2S$ thereto and performing mixing to form a precipitate;

a drying step in which the organic solvent is removed from the precipitate to obtain a precursor; and a heat treatment step in which the precursor is heated at 200 to 700° C. to obtain the LGPS-based solid electrolyte.

<6> The method according to item <5>, wherein the organic solvent is at least one selected from the group consisting of tetrahydrofuran, acetonitrile, ethyl acetate and methyl acetate.

<7> The method according to item <5> or <6>, wherein the temperature in the drying step is 60 to 280° C.

<8> The method according to any one of items <5> to <7>, wherein the heat treatment step is carried out under inert gas atmosphere.

Advantageous Effect of the Invention

According to the present invention, it is possible to provide an LGPS-based solid electrolyte which is not easily affected by the moisture environment in the production process.

EMBODIMENTS FOR CARRYING OUT THE INVENTION

Hereinafter, the LGPS-based solid electrolyte of the present invention, a method for producing the same, and an all-solid-state battery obtained by using the LGPS-based solid electrolyte will be specifically described. Note that materials, constitutions, etc. described below do not limit the present invention and can be modified variously within the range of the gist of the present invention.

<LGPS-Based Solid Electrolyte>

The LGPS-based solid electrolyte of the present invention satisfies a composition of $Li_uSn_vP_2S_yX_z$ ($6 \leq u \leq 14$, $0.8 \leq v \leq 2.1$, $9 \leq y \leq 16$, $0 < z \leq 1.6$; X represents Cl, Br or I).

Preferably, $6.5 \leq u \leq 12.0$, $0.85 \leq v \leq 1.70$, $9.5 \leq y \leq 14.5$, and $0.1 \leq z \leq 1.5$. More preferably, $7.0 \leq u \leq 12.0$, $0.85 \leq v \leq 1.60$, $10.0 \leq y \leq 14.5$, and $0.1 \leq z \leq 1.0$. Particularly preferably, $8.0 \leq u \leq 11.5$, $0.90 \leq v \leq 1.60$, $10.0 \leq y \leq 14.0$, and $0.1 \leq z \leq 0.7$. Further, X is preferably Br.

Note that the ratio of elements is an important factor for the development of an LGPS-specific crystal, and within the above-described range, a desired LGPS crystal can mainly exist. Further, an LGPS crystal can be satisfied even when a part of S atoms are substituted with O atoms, and in this case, the ratio of u, v, y and z may be outside the above-described range.

The aforementioned LGPS-based solid electrolyte preferably has peaks at at least $2\theta=19.80°\pm0.50°$, $20.10°\pm0.50°$, $26.60°\pm0.50°$ and $29.10°\pm0.60°$ (more preferably $29.10°\pm0.50°$) in X-ray diffraction (CuKα: λ=1.5405 Å). Note that it more preferably has peaks at $2\theta=17.00\pm0.50°$, $19.80°\pm0.50°$, $20.10°\pm0.50°$, $23.50\pm0.50°$, $26.60°\pm0.50°$, $28.60\pm0.50°$, and $29.10°\pm0.60°$ (more preferably $29.10°\pm0.50°$).

Regarding the aforementioned LGPS-based solid electrolyte, when the diffraction intensity of the peak at $2\theta=29.10°\pm0.50°$ is referred to as $I_A$ and the diffraction intensity of the peak at $2\theta=27.33°\pm0.50°$ is referred to as $I_B$, $I_B/I_A$ is preferably less than 0.50. More preferably, $I_B/I_A$ is less than 0.40. This is because the peak of LGPS crystal corresponds to $I_A$ and a crystal phase having low ion conductivity corresponds to $I_B$.

Figure 1:
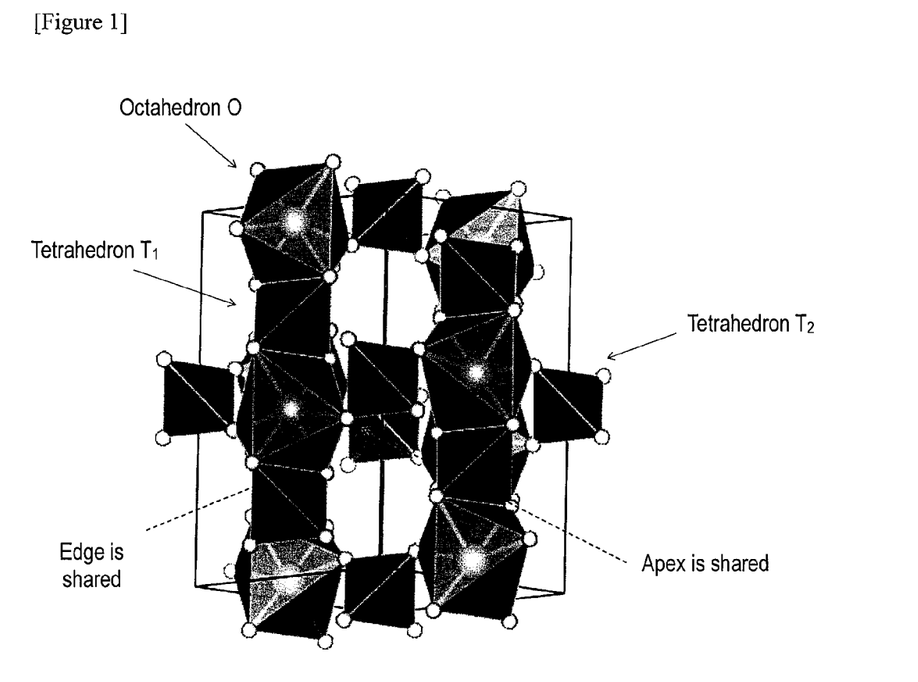
FIG. 1 is a schematic view showing a crystal structure of an LGPS-based solid electrolyte according to one embodiment of the present invention.

Moreover, it is preferred that the LGPS-based solid electrolyte has an octahedron O composed of an Li element and an S element, a tetrahedron $T_1$ composed of at least one element selected from the group consisting of P and Sn and an S element, and a tetrahedron $T_2$ composed of a P element and an S element, and mainly includes a crystal structure in which the tetrahedron $T_1$ and the octahedron O share an edge and the tetrahedron $T_2$ and the octahedron O share an apex as shown in FIG. 1. Note that a part of the S elements in the octahedron O, the tetrahedron $T_1$ and the tetrahedron $T_2$ may be substituted with Cl, Br or I.

<Method for Producing LGPS-Based Solid Electrolyte>

The method for producing the LGPS-based solid electrolyte of the present invention includes a step of mixing raw materials and a step of subjecting mixed raw materials to a heat treatment.

The method for mixing raw materials is not particularly limited. Examples thereof include: a method of using mechanical milling typified by a planetary ball mill, a vibrating mill and a bead mill; and a method for stirring and mixing raw materials in a solvent. For mass production, the method for stirring and mixing in a solvent is more preferred.

1. Raw Materials

The raw materials are not particularly limited, but $Li_2S$, $P_2S_5$, SnS or $SnS_2$, and LiX (X represents Cl, Br or I) can be used. Further, $Li_3PS_4$ that is obtained by reacting $Li_2S$ and $P_2S_5$ and $Li_4SnS_4$ that is obtained by reacting $SnS_2$ and $Li_2S$ can be used as raw materials.

As $Li_2S$, a commercially-available product or synthesized product can be used. Since the purity of $Li_2S$ significantly affects an LGPS-based solid electrolyte obtained by synthesis, the purity is preferably 95% or more, and more preferably 98% or more. In particular, when a carbonate ($CO_3^{2-}$) is contained, ion conductivity of the LGPS-based solid electrolyte is reduced.

$P_2S_5$ may contain a slight amount of O atoms. $P_2S_5$ reacts with $Li_2S$ to form $Li_3PS_4$, but even when a part of P—S bonds of $PS_4^{3-}$ are substituted with O atoms and P—O bonds exist, ion conductivity of an LGPS-based solid electrolyte finally obtained is not significantly reduced. In view of stability of P—S bonds, the case where P—O bonds partially exist is stabler, and in this case, the reactivity with water is suppressed and as a result, the effect of suppressing the generation of hydrogen sulfide is obtained.

The purity of $SnS_2$ is preferably high. It is considered that ion conductivity of an LGPS-based solid electrolyte finally obtained tends to be reduced due to Sn—O bonds in the case of $Li_4SnS_4$ that is generated by reacting $SnS_2$ and $Li_2S$, unlike the case of $Li_3PS_4$. Accordingly, the purity of $SnS_2$ is preferably 95% or more, and more preferably 98% or more. Since $SnS_2$ does not easily react with water, it can be used as a raw material of the LGPS-based solid electrolyte in the production process without reduction in the purity of $SnS_2$.

As LiX (X represents Cl, Br or I), a commercially-available product or synthesized product can be used. The purity thereof is preferably 95% or more, and more preferably 98% or more. The moisture content in LiX (X represents Cl, Br or I) is preferably less than 50 ppm, and more preferably less than 10 ppm. This is because moisture from raw materials causes the generation of a by-product in the production process of the LGPS-based solid electrolyte. Since a hydrate of LiI is stable, moisture must be strictly controlled.

2. Mixing Method

The mixing method is not particularly limited as long as raw materials can be homogeneously dispersed. Examples thereof include mechanical milling using a bead mill, a vibrating mill or a planetary ball mill, wherein either a wet process or a dry process can be employed. It is preferred that raw materials are amorphized, but it is not necessarily required to amorphize all the raw materials, and it is sufficient when fine particles of the respective raw materials have a size of several µm or less and are mixed sufficiently. Note that mechanical milling is preferably carried out under inert gas atmosphere.

As a mixing method for mass production, the method for stirring and mixing in a solvent described below is more preferred compared to mechanical milling described above.

The method for stirring and mixing in a solvent will be described in detail.

One embodiment of the present invention has:

a solution-making step in which a homogeneous solution is produced by mixing and reacting $Li_2S$ and $P_2S_5$ in an organic solvent, wherein the molar ratio of $Li_2S/P_2S_5$ is 0.75 to 1.85;

a precipitation step in which LiX (X represents Cl, Br or I) is added to and suspended in the homogeneous solution, followed by adding $SnS_2$ and $Li_2S$ thereto and performing mixing to generate a precipitate; and a drying step in which the organic solvent is removed from the precipitate to obtain a precursor.

In the precipitation step, it is preferred that $SnS_2$ is added and then $Li_2S$ is additionally added.

Hereinafter, the respective steps will be described in detail.

A. Solution-Making Step

In the solution-making step in the present invention, $Li_2S$ and $P_2S_5$ are mixed and reacted in an organic solvent at a molar ratio of $Li_2S/P_2S_5$=0.75 to 1.85 to produce a homogeneous solution. In the present invention, the homogeneous solution means a solution in which there is no undissolved precipitate. In this regard, the above-described molar ratio is preferably $Li_2S/P_2S_5$=0.85 to 1.5, and more preferably $Li_2S/P_2S_5$=0.9 to 1.4. When the molar ratio of $Li_2S/P_2S_5$ is 0.75 to 1.85, a solution can be made by using $Li_2S$ and $P_2S_5$ at room temperature. When the molar ratio is not within the above-described range, precipitation may be caused. Note that when an undissolved precipitate is separated from a solution by means of filtration or the like, the composition in the solution becomes the same as that obtained in the solution-making step carried out with a molar ratio within the above-described range.

As $Li_2S$, a synthesized product or commercially-available product can be used. The lower the content of moisture is, the better it is because mixing of moisture deteriorates the other raw materials and the precursor. The content is more preferably 300 ppm or less, and particularly preferably 50 ppm or less. The smaller the particle diameter of $Li_2S$ is, the better it is because a higher reaction rate is obtained. The particle diameter is preferably 10 nm to 100 µm, more preferably 100 nm to 30 µm, and even more preferably 300 nm to 10 µm. Note that the particle diameter can be measured by means of SEM, a particle size distribution measurement apparatus utilizing laser scattering, or the like.

As $P_2S_5$, a synthesized product or commercially-available product can be used. The higher the purity of $P_2S_5$ is, the better it is because the amount of impurities mixed into the solid electrolyte becomes smaller. The smaller the particle diameter of $P_2S_5$ is, the better it is because a higher reaction rate is obtained. The particle diameter is preferably 10 nm to 100 µm, more preferably 100 nm to 30 µm, and even more preferably 300 nm to 10 µm. The lower the content of moisture is, the better it is because mixing of moisture deteriorates the other raw materials and the precursor. The content is more preferably 300 ppm or less, and particularly preferably 50 ppm or less.

The organic solvent is not particularly limited as long as it does not react with $Li_2S$ or $P_2S_5$. Examples thereof include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. Particularly preferred are tetrahydrofuran and acetonitrile. For preventing deterioration of the raw material composition, it is preferred to remove oxygen and water in the organic solvent in advance. In particular, regarding the moisture content, it is preferably 100 ppm or less, more preferably 50 ppm or less, and particularly preferably 10 ppm or less.

The total concentration of $Li_2S$ and $P_2S_5$ in the organic solvent is preferably 1 to 40% by weight, more preferably 5 to 30% by weight, and particularly preferably 10 to 20% by weight. When the total concentration of $Li_2S$ and $P_2S_5$ in the organic solvent is higher than 40% by weight, the viscosity of a slurry is increased and it may become difficult to perform mixing. Meanwhile, when the total concentration of $Li_2S$ and $P_2S_5$ in the organic solvent is lower than 1% by weight, a large amount of the organic solvent must be used and a load of solvent recovery is increased. In addition, it causes excessive increase in the size of a reactor.

Regarding the reaction mechanism of the solution-making step in the present invention, $Li_2S$ gradually reacts with $P_2S_5$ suspended in the organic solvent, resulting in a state in which a solution can be made. However, it is preferred that firstly $Li_2S$ is added to and suspended in the organic solvent, followed by gradually adding $P_2S_5$ thereto. This is because, when $Li_2S$ is added in a state where $P_2S_5$ is in an excess amount, a condensed polymer may be generated.

At the time of mixing in the solution-making step, a substrate is dispersed to provide a slurry state, but it is reacted to become a homogeneous solution finally. There is no need to carry out special stirring operation for crushing particles, and it is sufficient when stirring power that can enable suspension and dispersion of the slurry is provided.

Regarding the reaction temperature in the solution-making step, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when mixing is carried out at a high temperature (120° C. or higher), there is concern that a side reaction may proceed.

The reaction time in the solution-making step varies depending on the type of the organic solvent and the particle diameter and concentration of raw materials, but for example, by performing the reaction for 0.1 to 24 hours, the reaction is completed and a solution can be made.

In the mixed solution made, a slight amount of a precipitate may be generated depending on the composition ratio for adding and the condition of mixing of raw material impurities. In this case, it is desirable to remove the precipitate by means of filtration or centrifugation.

B. Precipitation Step

To the homogeneous solution obtained in the solution-making step, LiX (X represents Cl, Br or I) is added, and stirring is carried out to dissolve LiX therein. LiX is added because it is considered that the interaction between S and Li can be reduced when a part of S elements in the LGPS crystal are substituted with X and it was found that ion conductivity is improved thereby. Note that when the amount of LiX added is too much, a crystal other than the LGPS crystal such as an argyrodite-type crystal is generated and ion conductivity is reduced. The amount of LiX to be added is preferably 0.01 to 1.6 times, and more preferably 0.1 to 1.5 times the molar quantity of $P_2S_5$ in the homogeneous solution.

After that, $SnS_2$ is added thereto and suspended therein by mixing. The amount of $SnS_2$ to be added is preferably 0.8 to 2.1 times, and more preferably 0.85 to 1.70 times the molar quantity of $P_2S_5$ in the homogeneous solution. Next, $Li_2S$ is additionally added and mixing is carried out to generate a precipitate. Regarding $Li_2S$ to be additionally added, the total amount of $Li_2S$ to be added is preferably 3.0 to 7.0 times, and more preferably 3.2 to 6.0 times the molar quantity of $P_2S_5$ in the homogeneous solution.

As a mixing method, mixing using an ordinary stirring blade is sufficient. For the purpose of crushing particles of $SnS_2$ and $Li_2S$ added, it is preferred to perform disintegration by means of stirring. Moreover, a homogenizer or an ultrasonic disperser may also be used.

Regarding $SnS_2$, usually, the valence of the element is preferably tetravalent. Specifically, it is $SnS_2$, and either a commercially-available product or a synthesized product may be used. $SnS_2$ is preferably in the form of fine particles because better compatibility is obtained. The particle diameter is preferably 10 nm to 100 μm, more preferably 100 nm to 30 μm, and even more preferably 300 nm to 10 μm. The particle diameter can be measured by means of SEM, a particle size distribution measurement apparatus utilizing laser scattering, or the like. Note that there is no problem even when a part of the above-described raw materials to be used are amorphous. The lower the content of moisture is, the better it is because mixing of moisture deteriorates the other raw materials and the precursor. The content is more preferably 300 ppm or less, and particularly preferably 50 ppm or less.

When $Li_2S$ is additionally added to a suspension obtained by suspending $SnS_2$ in the homogeneous solution, a precipitate gradually increases. The precipitate may be a solvate. For example, it is considered that when tetrahydrofuran (THF) is used as the organic solvent, $Li_3PS_4 \cdot 3THF$ crystal is obtained. $Li_2S$ to be added may be the same as that used in the solution-making step.

The precipitate is generated when the reaction proceeds to produce $Li_3PS_4$. The reaction mechanism is not known, but it is considered that the material is dissolved in the solution in the state of —(P—S—P—S)n-. It is considered that $Li_2S$ added thereto is dispersed in a slurry state and cleaves P—S, thereby producing $Li_3PS_4$.

The mixing time for suspending $SnS_2$ in the homogeneous solution is preferably 0.1 to 24 hours. By carrying out mixing to this extent, a state in which $SnS_2$ is sufficiently suspended is obtained. The mixing time after $Li_2S$ is further added may be 0.1 to 48 hours, and it is more preferably 4 to 36 hours. Note that since $Li_2S$ further added reacts with $Li_2S$—$P_2S_5$ in a solution state, when the reaction time is short, desired $Li_3PS_4$ is produced insufficiently and unreacted $Li_2S$ is mixed in the precipitate.

The temperature at the time of mixing may be room temperature. Heating may be performed, but when the temperature is too high, there is concern that a side reaction may proceed. When heating is performed, it is sufficient when it is performed at a temperature that is the boiling point of the organic solvent or lower. The temperature varies depending on the organic solvent to be used, but is usually lower than 120° C.

Mixing in the precipitation step is preferably performed under inert gas atmosphere. Examples of the inert gas include nitrogen, helium and argon, and particularly preferred is argon. By also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

C. Drying Step

The obtained precipitate is dried to remove the organic solvent, thereby obtaining a precursor. Drying can be carried out by means of heated-air drying or vacuum drying under inert gas atmosphere.

Figure 2:
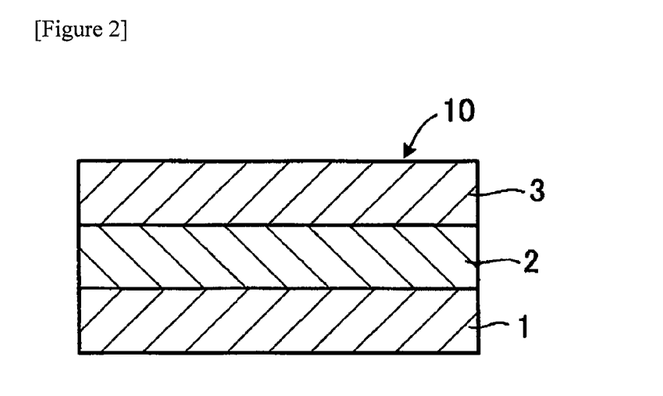
FIG. 2 is a schematic cross sectional view of an all-solid-state battery according to one embodiment of the present invention.

The drying temperature is preferably 60 to 280° C., and more preferably 100 to 250° C. The optimum temperature range slightly varies depending on the type of the organic solvent, but the temperature range is important. When the drying temperature is set to be too high in a state where the organic solvent exists, the quality of the precursor changes in almost all cases. Further, when the drying temperature is too low, the amount of the residual solvent is larger, and when the next heat treatment step is directly carried out, the organic solvent is carbonized and an LGPS-based solid electrolyte obtained has high electron conductivity. It may be preferred that the solid electrolyte has electron conductivity depending on the method for using it, but the solid electrolyte to be used for the portion 2 in FIG. 2 is required to have sufficiently low electron conductivity. In the case of using the solid electrolyte for such applications, the amount of the residual solvent must be decreased as much as possible.

The drying time slightly varies depending on the type of the organic solvent and the drying temperature, but the organic solvent can be sufficiently removed by drying for 1 to 24 hours. Note that by removing the organic solvent under reduced pressure as in the case of vacuum drying, and by flowing an inert gas such as nitrogen and argon in which the moisture content is sufficiently low, the temperature at the time of removing the organic solvent can be lowered and the required time can be shortened.

Note that the heat treatment step described below and the drying step can be carried out simultaneously.

D. Heat Treatment Step

In the production method of the present invention, the precursor obtained in the drying step is heat treated, thereby obtaining the LGPS-based solid electrolyte. The heating temperature varies depending on the type, and it is usually 200 to 700° C., more preferably 350 to 650° C., and particularly preferably 400 to 600° C. When the temperature is lower than the above-described range, desired crystals are not easily generated, and when the temperature is higher than the above-described range, crystals other than those desired are generated.

The heating time slightly varies depending on the heating temperature, but usually, crystallization is sufficiently performed when the heating time is 0.1 to 24 hours. It is not preferred that heating is carried out at a high temperature for a long period of time which exceeds the above-described range because there is concern for change in quality of the LGPS-based solid electrolyte.

Heating can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the precipitation step.

The LGPS-based solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described in <All-solid-state battery> below can be used.

<All-Solid-State Battery>

The LGPS-based solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The LGPS-based solid electrolyte of the present invention may be contained as a solid electrolyte in at least one of the positive electrode layer 1, the negative electrode layer 3 and the solid electrolyte layer 2. In the case where the LGPS-based solid electrolyte of the present invention is contained in the positive electrode layer 1 or negative electrode layer 3, the LGPS-based solid electrolyte of the present invention is used in combination with a publicly-known positive electrode active material or negative electrode active material for lithium ion secondary batteries. The quantitative ratio of the LGPS-based solid electrolyte of the present invention to be contained in the positive electrode layer 1 or negative electrode layer 3 is not particularly limited.

In the case where the LGPS-based solid electrolyte of the present invention is contained in the solid electrolyte layer 2, the solid electrolyte layer 2 may be composed of the LGPS-based solid electrolyte of the present invention alone, and according to need, an oxide solid electrolyte (e.g., $Li_7La_3Zr_2O_{12}$), a sulfide-based solid electrolyte (e.g., $Li_2S-P_2S_5$), other complex hydride solid electrolytes (e.g., $LiBH_4$ and $3LiBH_4-LiI$), etc. may be suitably used in combination. When using a material exhibiting strong reducing power such as a metal Li for a negative electrode active material, a reaction occurs in the interface between the LGPS-based solid electrolyte of the present invention and the active material, and an irreversible capacity and resistance increase may occur. In order to prevent these phenomena, it is preferred to provide a solid electrolyte having reduction resistance, a complex hydride solid electrolyte, an argyrodite-type sulfide solid electrolyte, sulfide glass ceramic or the like at the negative electrode layer side or on the surface of the negative electrode active material.

The all-solid-state battery is prepared by forming and layering the above-described layers, and the forming method and layering method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and layering are performed by using a vacuum deposition method, ion plating method, sputtering method, laser ablation method or the like; and a pressing method in which powder is formed by hot pressing or cold pressing (not heating) and layering is performed.

Since the LGPS-based solid electrolyte of the present invention is relatively soft, it is particularly preferred to prepare the all-solid-state battery by forming the respective layers by means of the pressing method and layering the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the LGPS-based solid electrolyte of the present invention. The formed body is suitably used as the all-solid-state battery. Further, the present invention includes a method for producing an all-solid-state battery, which includes a step of heating and forming the LGPS-based solid electrolyte of the present invention.

EXAMPLES

Hereinafter, the embodiments of the present invention will be more specifically described by way of examples, but the embodiments are not limited to the examples.

Example 1

<Solution-Making Step>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S:P_2S_5$ became 1:1. Next, to acetonitrile (manufactured by Wako Pure Chemical Industries, Ltd., super dehydrated grade), $Li_2S$ and $P_2S_5$ were added in this order so that the concentration of $(Li_2S+P_2S_5)$ became 10 wt %, and mixing was carried out at room temperature for 12 hours. The mixture was gradually dissolved, and a homogeneous solution was obtained.

<Precipitation Step>

To the obtained homogeneous solution, LiBr (manufactured by Sigma-Aldrich, purity: 99.8%) in an amount of 0.29 time the molar quantity of $P_2S_5$ in the homogeneous solution was added while stirring and dissolved. Subsequently, $SnS_2$ (GEI04PB manufactured by Kojundo Chemical Laboratory Co., Ltd.) in an amount of 1.09 times the molar quantity of $P_2S_5$ in the homogeneous solution was added while stirring, and mixing was carried out at room temperature for 12 hours. Subsequently, $Li_2S$ in an amount of 3.2 times the molar quantity of $P_2S_5$ in the homogeneous solution was added while stirring (that is, based on the total amount, the molar ratio of $Li_2S:SnS_2:P_2S_5:LiBr=4.18:1.09:1:0.29$), and mixing was carried out at room temperature for 24 hours to obtain a slurry solution.

<Drying Step>

The obtained slurry solution was vacuum dried at 200° C. for 3 hours to obtain a precursor. The series of operations was carried out in the glovebox under argon atmosphere.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 475° C. over 3 hours, and then burning was carried out at 475° C. for 8 hours, thereby synthesizing $Li_{8.66}Sn_{1.09}P_2S_{11.36}Br_{0.29}$ crystal.

Example 2

$Li_{8.66}Sn_{1.09}P_2S_{1.36}Cl_{0.29}$ crystal was synthesized in a manner similar to that in Example 1, except that LiCl was used instead of LiBr.

Example 3

$Li_{8.66}Sn_{1.09}P_2S_{11.36}Cl_{0.29}$ crystal was synthesized in a manner similar to that in Example 1, except that LiI was used instead of LiBr.

Comparative Example 1

$Li_{9.81}Sn_{0.81}P_{2.19}S_{12}$ crystal was synthesized in a manner similar to that in Example 1, except that, in <Precipitation step> of Example 1, LiBr was not added; $SnS_2$ was added in an amount of 0.74 time the molar quantity of $P_2S_5$; and $Li_2S$ was added in an amount of 4.48 times the molar quantity of $P_2S_5$.

<X-Ray Diffraction Measurement>

Powders of the ion conductors obtained in Examples 1-3 and Comparative Example 1 were subjected to the X-ray diffraction measurement under Ar atmosphere at room temperature (25° C.) ("X'Pert3 Powder" manufactured by PANalytical, CuKα: λ=1.5405 Å).

Figure 3:
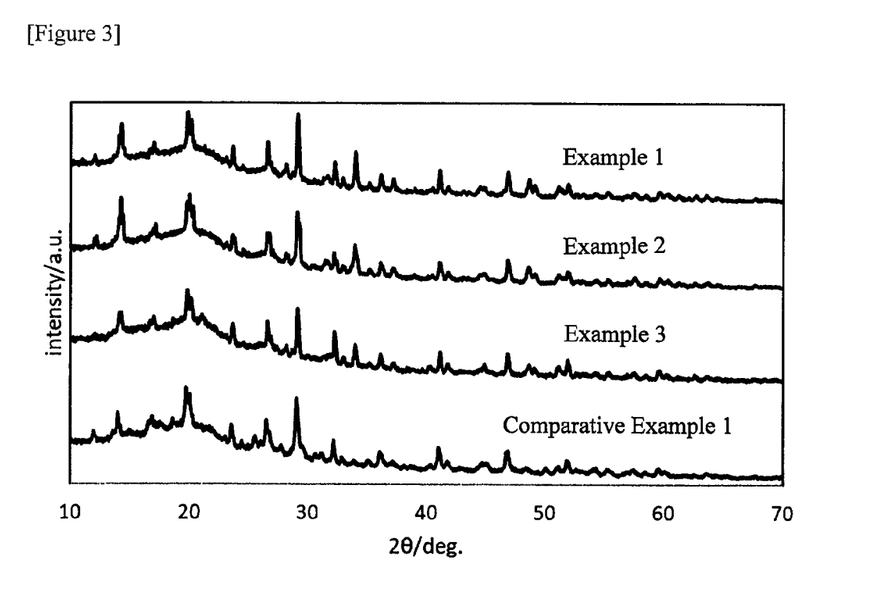
FIG. 3 is a graph showing the results of the X-ray diffraction measurement of the ion conductors obtained in Examples 1-3 and Comparative Example 1.

The results of the X-ray diffraction measurement of the ion conductors obtained in Examples 1-3 and Comparative Example 1 are shown in FIG. 3.

As shown in FIG. 3, in Examples 1-3, the diffraction peaks were observed at at least 2θ=19.80°±0.50°, 20.10°±0.50°, 26.60°±0.50° and 29.10°±0.50°, and the pattern corresponded to that of $Li_{10}GeP_2S_{12}$ of ICSD database.

When the diffraction intensity of the peak at 2θ=29.10°±0.50° is referred to as $I_A$ and the diffraction intensity of the peak at 2θ=27.33°±0.50° is referred to as $I_B$, $I_B$ was very small and in all of Examples 1-3, $I_B/I_A$ was 0.1 or less.

<Lithium Ion Conductivity Measurement>

Each of the ion conductors obtained in Examples 1-3 and Comparative Example 1 was subjected to uniaxial molding (420 MPa) to obtain a disk having a thickness of about 1 mm and a diameter of 10 mm. Using a cell for evaluating all-solid-state batteries (manufactured by Hohsen Corporation), the AC impedance was measured by the four-terminal method utilizing an indium electrode at room temperature (25° C.) ("SI1260 IMPEDANCE/GAIN-PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. The measurement frequency range was 0.1 Hz to 1 MHz, and the amplitude was 50 mV. The measurement results of the lithium ion conductivity are shown in Table 1 below.

TABLE 1

|  | Ion conductivity (S/cm) |
| --- | --- |
| Example 1 | 0.0028 |
| Example 2 | 0.0019 |
| Example 3 | 0.0015 |
| Comparative Example 1 | 0.0014 |

<Raman Spectroscopy>

(1) Preparation of Sample

A sample to be measured was prepared by using an airtight container having quartz glass (Φ: 60 mm, thickness: 1 mm) at the upper portion as an optical window. In a glovebox under argon atmosphere, the sample was adhered to the quartz glass, then the container was sealed and taken out from the glovebox, and Raman spectroscopy was carried out.

(2) Measurement Conditions

Figure 4:
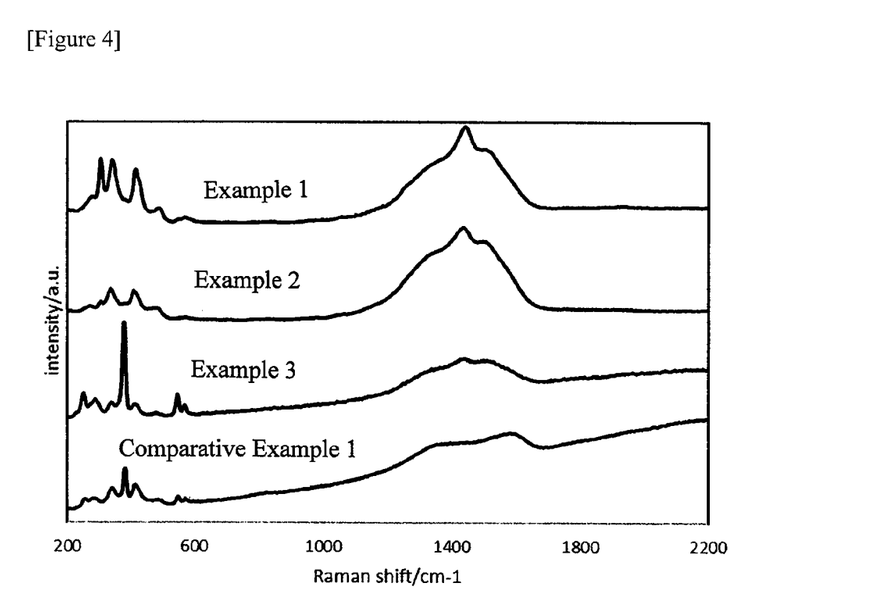
FIG. 4 is a graph showing the results of Raman spectroscopy of the ion conductors obtained in Examples 1-3 and Comparative Example 1.

Using Laser Raman Spectrometer NRS-5100 (manufactured by JASCO Corporation), the measurement was carried out at an excitation wavelength of 532.15 nm for an exposure time of 5 seconds. The results of Raman spectroscopy of the ion conductors obtained in Examples 1-3 and Comparative Example 1 are shown in FIG. 4.

EXPLANATIONS OF LETTERS OR NUMERALS 1 positive electrode layer
2 solid electrolyte layer
3 negative electrode layer
10 all-solid-state battery

The invention claimed is:

1. An LGPS-based solid electrolyte, which satisfies a composition of $Li_uSn_vP_2S_yX_z$ (6≤u≤14, 0.8≤v≤2.1, 9≤y≤16, 0<z≤1.6; X represents Cl, Br or I), and which has peaks at at least 2θ=19.80°±0.50°, 20.10°±0.50°, 26.60°±0.50° and 29.10°±0.50° in X-ray diffraction (CuKα: λ=1.5405 Å).

2. The LGPS-based solid electrolyte according to claim 1, wherein when a diffraction intensity of the peak at 2θ=29.10°±0.50° is referred to as $I_A$ and a diffraction intensity of the peak at 2θ=27.33°±0.50° is referred to as $I_B$, $I_B/I_A$ is less than 0.50.

3. The LGPS-based solid electrolyte according to claim 1, which has an octahedron O composed of an Li element and an S element, a tetrahedron $T_1$ composed of at least one element selected from the group consisting of P and Sn and an S element, and a tetrahedron $T_2$ composed of a P element and an S element, and which mainly includes a crystal structure in which the tetrahedron $T_1$ and the octahedron O share an edge and the tetrahedron $T_2$ and the octahedron O share an apex, wherein a part of the S elements in the octahedron O, the tetrahedron $T_1$ and the tetrahedron $T_2$ may be substituted with Cl, Br or I.

4. An all-solid-state battery obtained by using the LGPS-based solid electrolyte according to claim 1.

5. A method for producing the LGPS-based solid electrolyte according to claim 1, which comprises:
preparing a homogeneous solution by mixing and reacting $Li_2S$ and $P_2S_5$ in an organic solvent so that the molar ratio of $Li_2S/P_2S_5$ is 0.75 to 1.85;
precipitating by adding LiX (X represents Cl, Br or I) to the homogeneous solution to dissolve the LiX, followed by adding $SnS_2$ and $Li_2S$ thereto and performing mixing to form a precipitate;
drying to remove the organic solvent from the precipitate to obtain a precursor; and
heating the precursor at 200 to 700° C. to obtain the LGPS-based solid electrolyte.

6. The method according to claim 5, wherein the organic solvent is at least one selected from the group consisting of tetrahydrofuran, acetonitrile, ethyl acetate and methyl acetate.

7. The method according to claim 5, wherein a temperature in the drying is 60 to 280° C.

8. The method according to claim 5, wherein the heating is carried out under inert gas atmosphere.

* * * * *